United States Patent [19]

Grube

[11] Patent Number: 5,058,199
[45] Date of Patent: Oct. 15, 1991

[54] INTER-TRUNCKED RADIO SYSTEMS BRIDGE PROTOCOL

[75] Inventor: Gary W. Grube, Palatine, Ill.

[73] Assignee: Motorola, Inc., Schaumburg, Ill.

[21] Appl. No.: 517,094

[22] Filed: May 2, 1990

[51] Int. Cl.⁵ .......................... H04B 7/155; H04B 7/26
[52] U.S. Cl. ........................................ 455/15; 455/34; 455/54; 455/56
[58] Field of Search .................. 455/9, 7, 13, 11, 15, 455/20, 16, 23, 34, 33, 49, 54, 56; 370/26; 340/825.06, 425; 379/59, 60, 338

[56] References Cited

U.S. PATENT DOCUMENTS

| | | |
|---|---|---|
| 4,004,098 | 1/1977 | Shimasaki ........................ 179/15 BS |
| 4,506,383 | 3/1985 | McGann ................................ 455/17 |
| 4,539,706 | 9/1985 | Mears et al. ........................... 455/11 |
| 4,553,262 | 11/1985 | Coe ......................................... 455/15 |
| 4,578,815 | 3/1986 | Persinotti .............................. 455/15 |
| 4,731,866 | 3/1988 | Muratani ................................ 455/9 |

*Primary Examiner*—Curtis Kuntz
*Assistant Examiner*—Chi H. Pham
*Attorney, Agent, or Firm*—Jon P. Christensen

[57] ABSTRACT

A radio signal relay system for use with dispatch communication systems is disclosed. The radio signal relay system includes a linking device constructed with a first and a second full duplex transceivers such that it has the capability of communicating with the communication controller and at least one repeater in each of at least two adjacent communication systems.

6 Claims, 4 Drawing Sheets

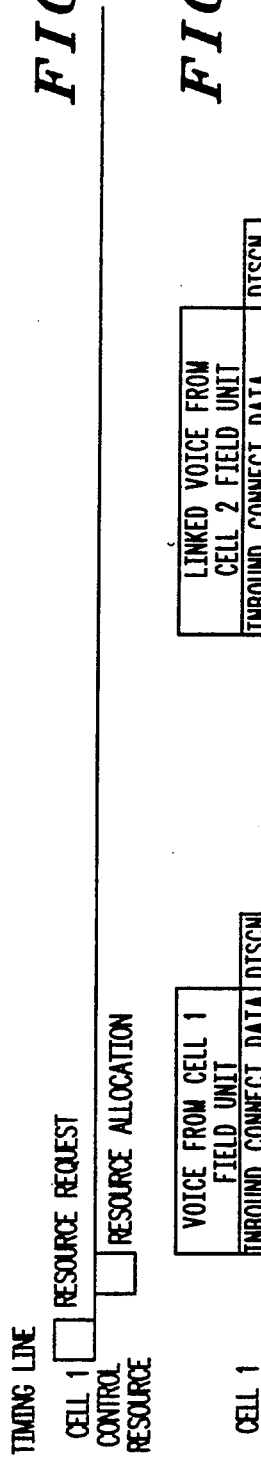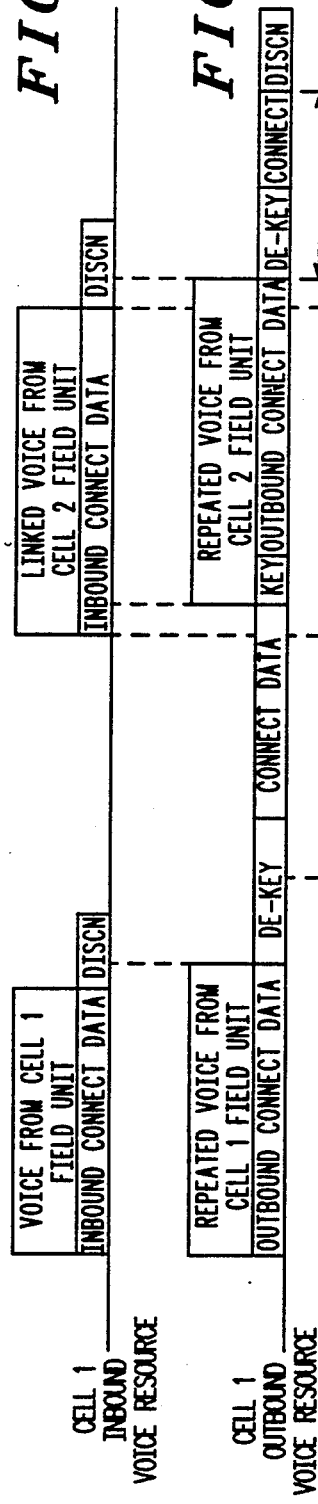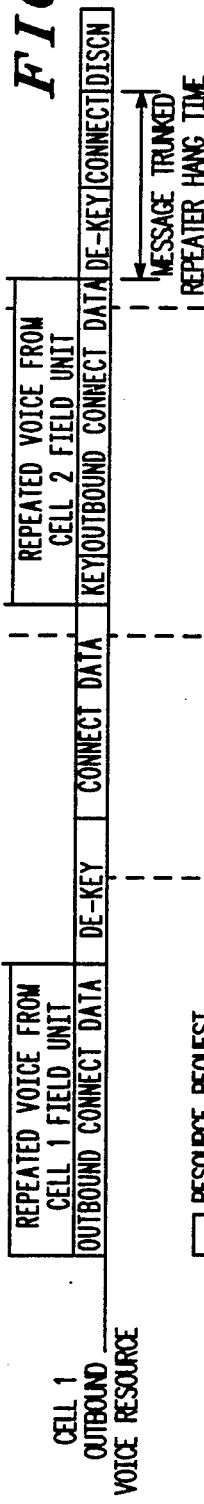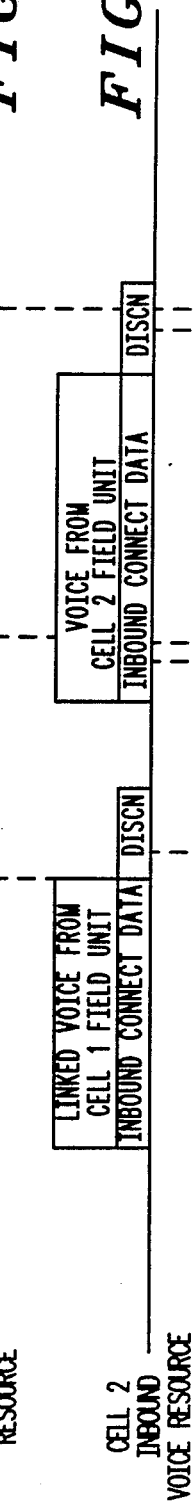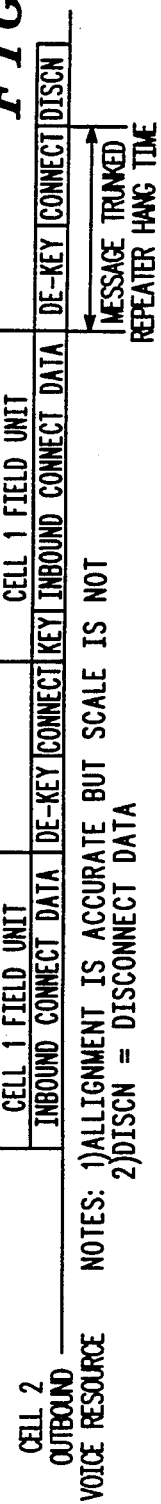

INTER-TRUNCKED RADIO SYSTEMS BRIDGE PROTOCOL

TECHNICAL FIELD

This invention relates generally to the field of communication systems and more specifically to trunked dispatch systems.

BACKGROUND OF THE INVENTION

Dispatch communication systems using trunking are known. Such systems typically use frequency pairs (i.e., a transmit frequency and a receive frequency) that are assigned by a resource controller for transmitting and receiving messages. The resource controller assigns the frequency pair upon receiving a request for service from a communication unit. Upon receiving the assignment data the requesting unit and all target units tune to the appropriate frequencies and two-way communication can occur.

Dispatch systems, unlike cellular telephony, are typically single site systems. Where there are geographically adjacent dispatch systems no provision is typically made for call hand-off when a user leaves a service area. Where a target is initially in the service coverage area of a cell and subsequently passes into the service coverage area of an adjacent cell the adjacent cell typically will not provide service (forward transmitted messages) to the target unit. Where a requestor is in an adjacent cell, initially, the adjacent cell, again, will not provide service to the requesting unit.

In a geographic re-use context, cell sizes have gotten smaller to allow for more users in given geographic areas. The needs of dispatch systems, on the other hand, have not changed in terms of necessary service coverage area. As cells have gotten smaller a need exists to permit contacting target communication units within the service coverage areas of adjacent dispatch communication systems.

SUMMARY OF THE INVENTION

Pursuant to one embodiment of this invention, radio link devices are constructed for each talk-group within a dispatch system. Radio link devices are devices constructed with a first and a second full duplex transceiver such that the radio link device has the capability of successfully communicating with the communication controller and at least one repeater in each of at least two base sites. These devices monitor a control resource for each service coverage area which the radio link device serves and have the capacity for relaying transmitted messages therebetween.

The radio link device listens to control resources within the monitored service coverage areas for resource allocations to the talk-group which the radio link device serves. Upon receipt and identification of such an allocation the radio link device tunes the transceiver receiving the allocation message to the allocated resource and, with the second of the two full duplex transceivers, transmits a resource allocation request to the resource controller within the adjacent base site.

Upon receipt and decoding of a resource allocation in the adjacent base site the link radio device tunes the second of the two full duplex transceivers to the allocated resource in the adjacent base site, establishes an audio path between the first transceiver and the second, and relays transmissions from a requestor in the first cell to any target communication units within the second cell.

Pursuant to one embodiment of this invention base site resource controllers and repeaters are constructed to receive a disconnect code from any transmitting communication unit, and to transmit through the repeater and to the radio link device a de-key message. The de-key message causes the link radio device to transmit a disconnect message thereby avoiding the problem of cascaded message-trunked-repeater-hang times.

When a heretofore target communication unit responds to a message within the repeater hang-time the unit's repeater transmits a key message to the radio link device. The key message is used by the radio link device to identify and allow for continuing messages and to allow the radio link device to transmit an identifying code to a requesting communication controller identifying the message as being part of the same on-going communication transaction.

BRIEF DESCRIPTION OF THE DRAWINGS

FIGS. 3A-3F shows a timing diagram of message transmission with a radio link device in accordance with the invention.

BEST MODE FOR CARRYING OUT THE INVENTION

Figure 1:
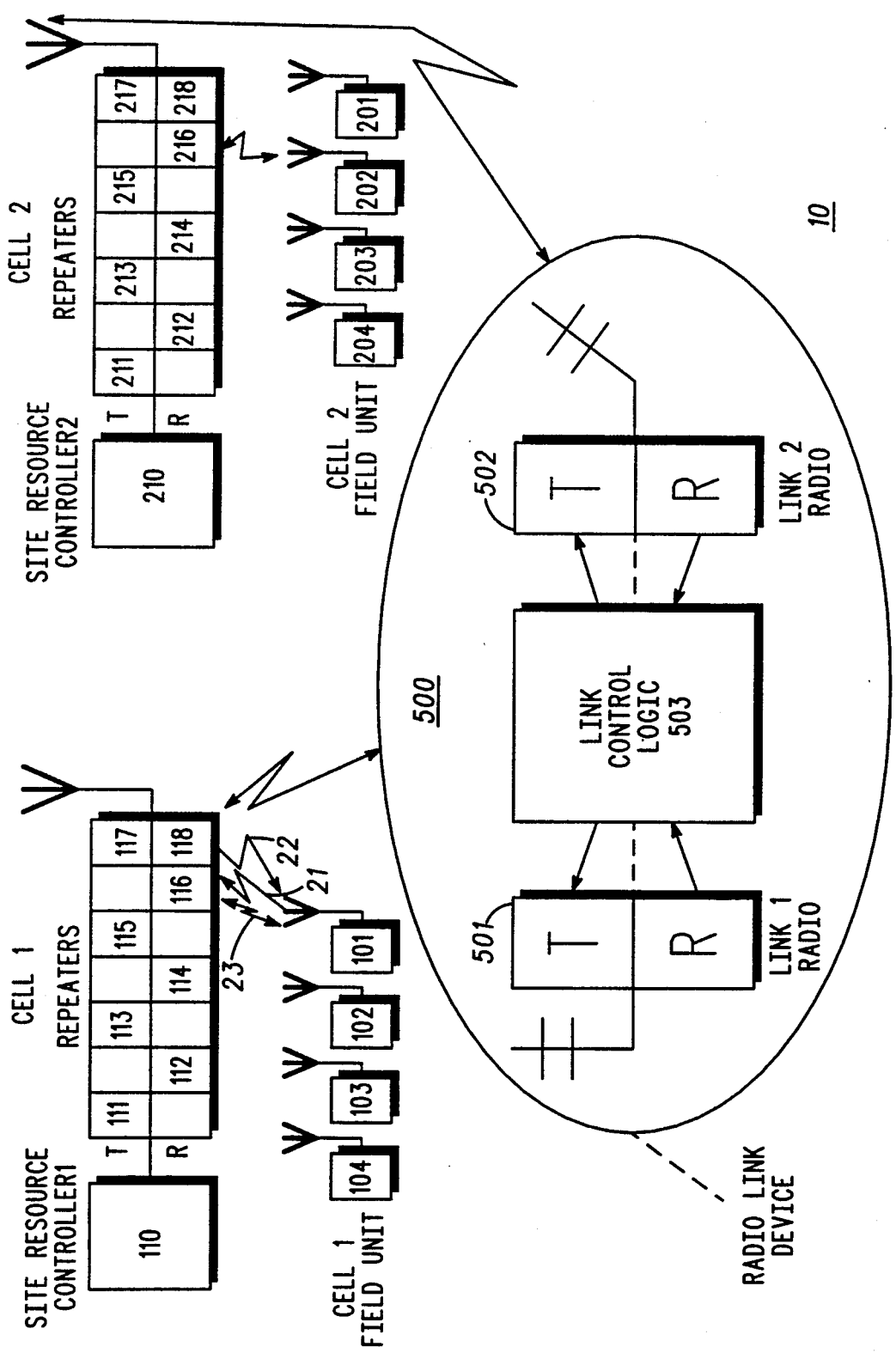
FIG. 1 shows two cells, and a radio link device for a trunked dispatch communication system in accordance with the invention.

Referring now to FIG. 1, two adjacent cells of a trunked dispatch radio communication system are depicted generally by the number 10. Cell 1 generally includes a plurality of communication units (101 through 104) (as used herein "communication units" refers to mobile units, or portable units), repeaters (111 through 116), a control resource transmitter (117), a control resource receiver (118), and a site resource controller (110). Cell 2 generally includes a plurality of communication units (201 through 204), repeaters (211 through 216), a control resource transmitter (217), a control resource receiver (218), and a site resource controller (210). Also shown in FIG. 1 is a radio link device (500). The radio link device (500) generally includes a link 1 radio (501), a link 2 radio (502), and link control logic (503).

As shown in FIG. 1, the two link radios (501 and 502) represent transceivers that substantially duplicate the function of a mobile transceiver (transmit on a mobile transmit frequency and receive on a mobile receive frequency). The purpose of the radio link device is to allow for the identification of resource grants for specific talk-groups and to route signals resulting from those resource grants to target units in adjacent cells.

The radio link device control logic (503 in FIG. 1) provides the control logic necessary for system operation. Shown (FIG. 4) is a flow diagram of the control algorithm for the radio link device. In general, to establish a dispatch call between a group of communication units operating within Cell 1, a requesting unit (101) sends a data packet called an ISW (21) (inbound signalling word) on the inbound frequency allocated to the control resource receiver (118). The ISW (21) typically contains the requesting communication unit's unique ID code (consisting of a fleet ID and an individual ID, plus a subfleet code indicating that group of units which the requesting communication unit wishes to talk to). The site resource controller (110) decodes the request, and transmits on the control resource transmitter (117) an appropriate frequency grant OSW (22) (outbound signaling word) to the requesting communication unit (101). The site resource controller (110) also allocates a repeater (115) to service the resource grant on the allocated frequencies.

The OSW (22) causes the requesting unit to move to the designated transmit and receive frequencies (allocated resource). This same OSW (22) causes any target units (102 and 103) located within the cell to move to the same frequencies.

When the requesting unit (101) initiates a voice transmission (23) communicated message the base site repeater (115) receives the transmission (23) and re-transmits the signal on the mobile's receive frequency. The target units (102 and 103) then receive the re-transmitted signal (23) on the allocated resource.

Figure 2:
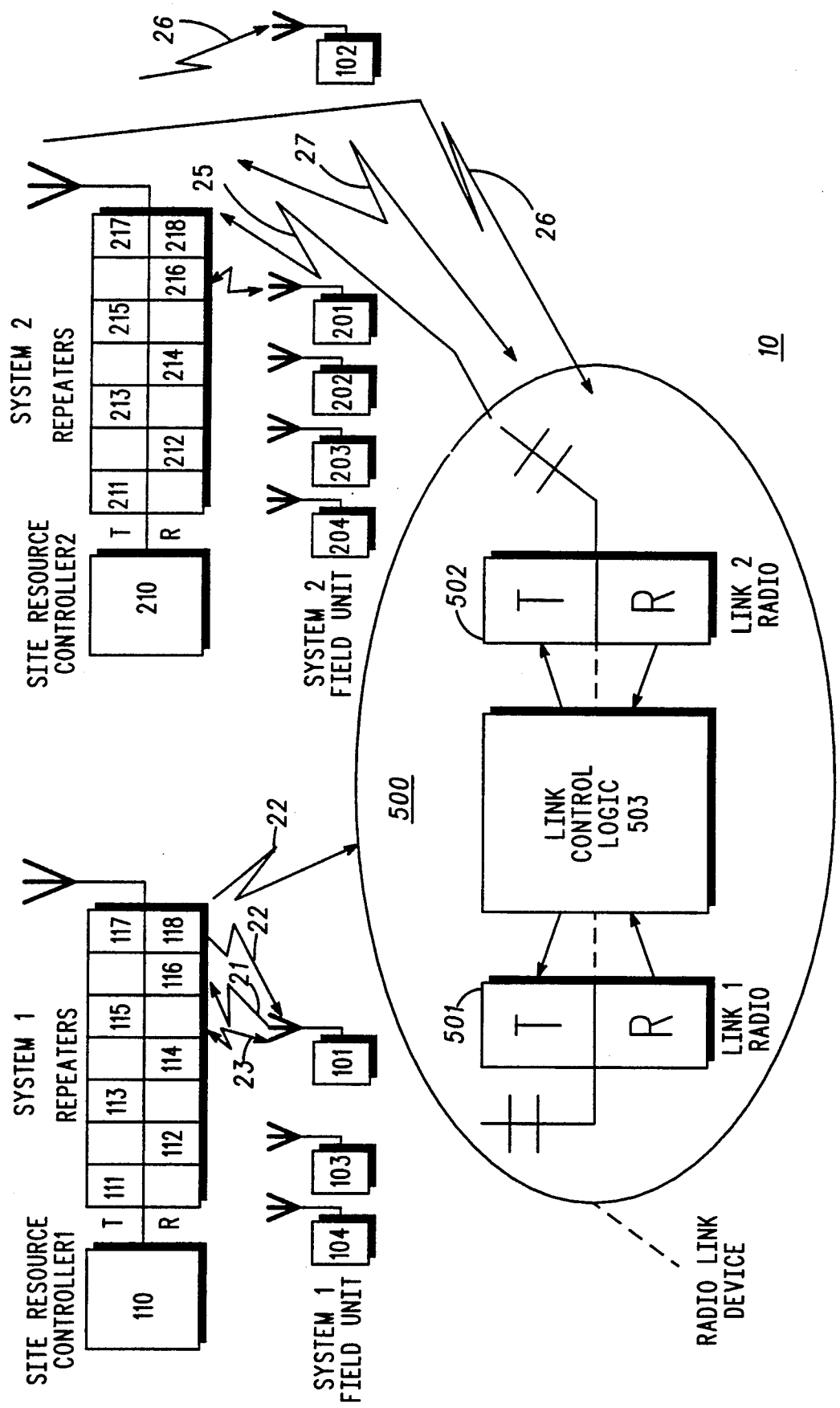
FIG. 2 shows two cell, a radio link device and at least one target unit in an adjacent cell in accordance with the invention.

A target communication unit (102), however, may be in another cell (Cell 2) (FIG. 2). In this case after sending a request for service (21), the requestor (101) and any targets in Cell 1 (103) receive an OSW identifying a resource grant (22) as above. In addition, however, the link 1 radio (501) also receives the OSW (22). The link 1 radio (501) transfers the OSW (22) to the link control logic (503) that decodes and interprets the OSW (22) as being a resource grant for a specific talk-group of which the radio link device (500) is a part (203 in FIG. 4). Upon identifying the resource grant as being a grant to the desired talk group, the link control logic (503) transfers a resource request to the link 2 radio for transmission to the adjacent cell (Cell 2) (204 in FIG. 4). The resource request (25) is transmitted over a control resource to a control resource receiver (218) and transferred to a resource controller (210) in the adjacent cell (Cell 2). The resource controller (210) in the adjacent cell (Cell 2) decodes the request and transmits back over a control resource transmitter (217) an appropriate frequency grant OSW (26) to the requesting communication unit (502). The site resource controller (210) also allocates a repeater (215) to service the resource grant on the allocated frequencies (205 in FIG. 4).

Figure 4:
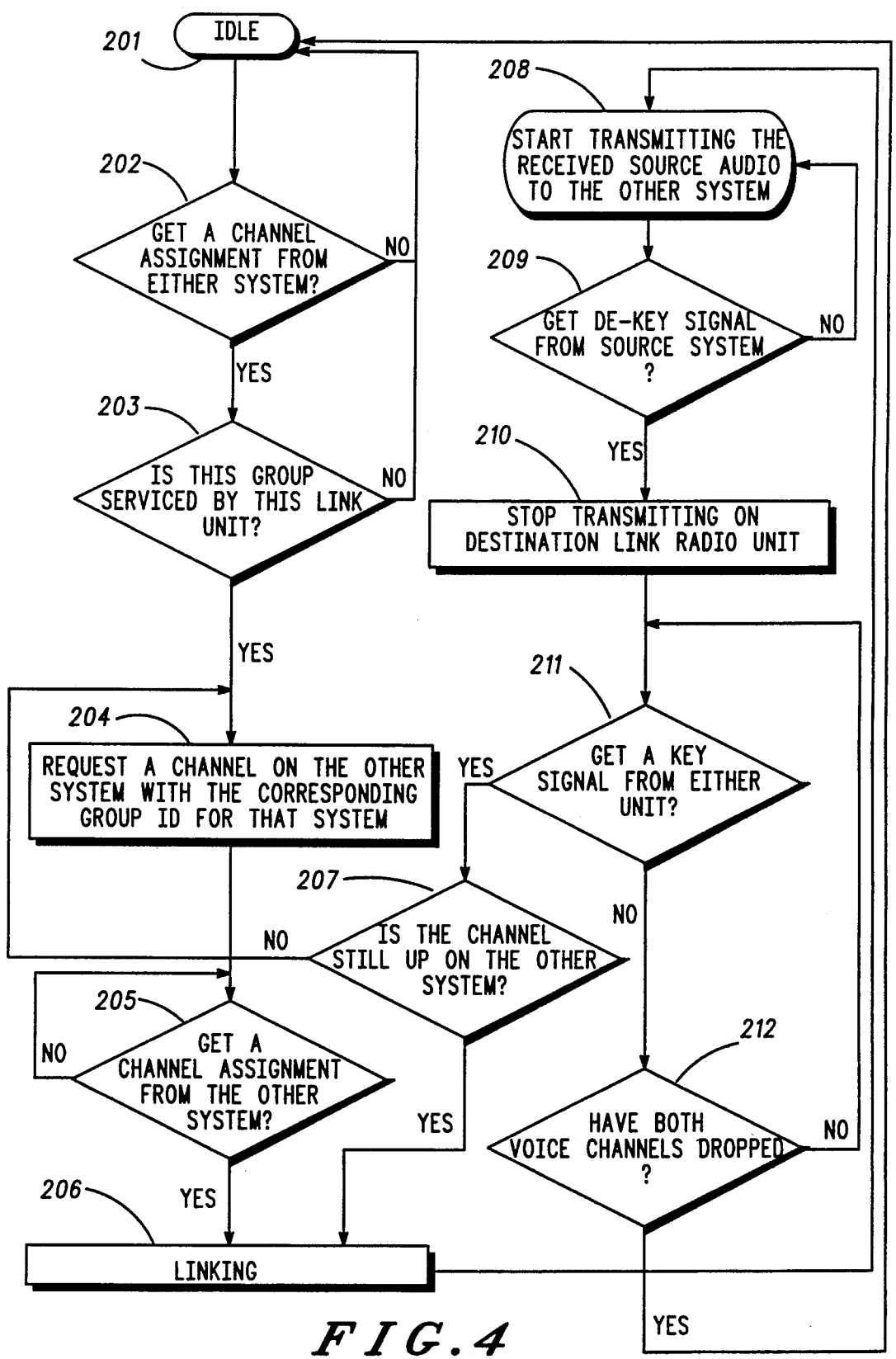
FIG. 4 shows the control algorithm for the radio link device in accordance with the invention.

The OSW (26) causes the link 2 radio to move to the designated transmit and receive frequencies (206 in FIG. 4). At the same time this OSW (26) causes any target units (102) located within the cell (Cell 2) to move to the receive frequency.

When the requesting unit (101) initiates a voice transmission (23) the base site repeater (115) receives the transmission (23) and re-transmits the signal on the mobile's receive frequency. The target units (103) receives the re-transmitted signal (23) on the allocated resource. The radio link device (500) receives the voice transmission (23) and re-transmits the voice transmission within the adjacent cell (Cell 2) (208 in FIG. 4) on the there-assigned resource (27) to the allocated repeater (215). The allocated repeater (215) then re-transmits the voice transmission (27) to any targets (102) within the cell (Cell 2).

FIG. 3 depicts a timing diagram describing the use of the radio link device (500 in FIG. 2). Shown in FIG. 3A is a summary of activity over the Cell 1 control resource. Shown in FIG. 3B is a summary of transmission activity from the requesting communication unit. FIG. 3C is a summary of transmission from the repeater in the first cell (Cell 1). FIG. 3D is a summary of activity over the Cell 2 control resource with the radio link device (500 in FIG. 2). FIG. 3E is a summary of transmissions of the radio link device (500 in FIG. 2) with the repeater in the second cell (Cell 2). FIG. 3F is a summary of repeated transmissions in Cell 2.

As shown the resource request (FIG. 3A) is followed closely in time with a resource allocation in the first cell. Following resource allocation, the requesting unit (101 in FIG. 2) may begin transmission (FIG. 3B). In this particular embodiment, the transmission of the requesting unit is shown to include voice data as well as subaudible signalling intended for the site resource controller in Cell 1 to identify the requesting transmitter and to preserve resource allocation.

The transmissions of the repeater in Cell 1 (FIG. 3C) also follow closely in time to resource allocation. The voice and data re-transmitted through the repeater in Cell 1 is identical with the voice and data transmitted by the requesting communication unit. The subaudible signalling, on the other hand, is not. The subaudible signalling transmitted by the repeater in Cell 1 in this case identifies such things as talk-group ID and allocated resource ID.

The resource request and allocation in Cell 2 (FIG. 3D) is shown to be somewhat delayed in time when compared to resource allocation in Cell 1. The reason for the delay is the decode and interpretation time of both the radio link device and the communication controller in Cell 2 between receiving the resource allocation in Cell 1 and before receiving the resource allocation in Cell 2. As a result a short delay occurs between voice transmission in Cell 1 and voice transmission in Cell 2. A small amount of voice data from the requesting communication unit (101) may be lost because of the delay.

Shown at the end of transmission (FIG. 3B) is a disconnect code transmitted by the requesting communication unit (101) at the end of the voice transmission. The disconnect code is transmitted by each mobile communication unit at the end of each transmission. The purpose for the disconnect code is to start a repeater hang-time timer within the resource controller at the base site to which the mobile unit is transmitting. The purpose of the repeater hang-time timer is to allow a target to respond within a pre-allotted time period without the target having to re-establish a resource allocation. Depending on the embodiment, this disconnect code can also be used to support a squelch methodology for the target units.

When the timer within the resource controller times-out the resource is de-allocated. If a mobile unit begins transmitting before time-out the timer is reset and allocation is retained. The disconnect code is not re-transmitted through the repeater in the requestor's cell. The repeater receives the disconnect code and re-transmits the voice data along with its own unique code called a de-key message.

As a part of this invention the repeaters in all cells, after receiving a disconnect code, transmit along with the repeated message a de-key message. The de-key message is intended for use by the radio link devices to cause the radio link device to transmit its own disconnect code to the resource controller at the adjacent cell (the short delay between the disconnect code in Cell 1 and Cell 2, again, represents decoding time).

Upon receipt of the de-key message a disconnect code (FIG. 3E) is transmitted by the radio link device (500) to the resource controller in Cell 2 followed by shut-down of the link radio transmitter (209 and 210 in FIG. 4). The repeater in Cell 2, in turn, transmits a de-key code along with the re-transmitted voice data and its own unique subaudible signalling. The presence of the de-key code from the repeater in Cell 2 allows for the use of additional radio link devices within Cell 2 potentially extending the range of the invention to a Cell 3 or to a Cell 4 and to additional cells far beyond the two described in this preferred embodiment.

Shown at the end of the de-key code (FIG. 3C and FIG. 3F) is a section of the timing line labeled "message trunked repeater hang time." The length of the displayed section represents the total time between receipt of the disconnect code and resource de-allocation. Without the re-transmitted disconnect tone from the radio link device the de-allocation timer in Cell 2 would not start until the de-allocation timer in Cell 1 had timed out. The result would be an inefficient use of communication resources because of cascaded message-trunked-repeater-hang time.

If a heretofore target communication unit should respond to a transmitted message before the repeater hang-time timer has timed out then the allocated resource is still available to the target (211 in FIG. 4). The target upon initiation of a transmitted message also transmits its own unique ID through subaudible signalling within the transmitted message.

The repeater resource upon receipt of a response transmission from the heretofore target unit must alert the radio link device to re-transmit the message to the heretofore requesting unit. The repeater resource alerts the radio link device through the inclusion of a key message (FIG. 3E) as a part of the subaudible signalling included as a part of the repeated message to the radio link device. The radio link device does not repeat the key message when it re-transmits the response message but does include the ID of the source of the message in the transmitted subaudible signalling. The repeater in the first base site upon receipt of the response message repeats the message with a key in the subaudible signalling (FIG. 3C) for the benefit of any other radio link devices.

What is claimed is:

1. A communication system comprising:
   A. a plurality of communication units;
   B. at least a first and a second base site each with a service coverage area, each base site further comprising a resource controller, with a control resource;
   C. a requesting communication unit within the coverage area of the first base site;
   D. at least one target communication unit in the coverage area of the second base site;
   E. at least one radio link device comprising:
      i. means for identifying a resource allocation for a specific talk-group over the control resource from the first base site;
      ii. means for requesting a resource allocation over the control resource from the resource controller in the second base site;
      iii. means for receiving a resource allocation over the control resource from the resource controller in the second base site;
      iv. means for receiving and, upon occasion, transmitting a communicated message over the allocated resource in the first base site and means for transmitting and, upon occasion, receiving the communicated message over the allocated resource in the second base site, and;
      v. means for routing the communicated message from the receiving means for communicated messages from the first base site to the transmitting means for communicated messages to the second base site and visa versa.

2. The communication system as in claim 1 wherein the communication controller in the first base site detects an end of transmission and re-transmits a de-key message to any radio link device present and upon receipt by the radio link device of such de-key message the radio link device transmits an end of transmission message to the second base site.

3. The communication system as in claim 1 wherein the communication controller within the second base site and within the repeater-hang-time time period detects an initiation of transmission from a heretofore target communication unit and re-transmits a key message to any radio link device present and upon receipt by the radio link device of such key message the radio link device immediately re-transmits a substantially identical message to the first base site.

4. A method of assigning communication resources to communication units in a communication system having:
   A. a plurality of communication units;
   B. at least a first and a second base site each with a service coverage area, each base site further comprising a resource controller, with a control resource;
   C. a requesting communication unit within the coverage area of the first base site;
   D. at least one target communication unit in the coverage area of the second base site;
   E. at least one radio link device comprising:
      i. means for identifying a resource allocation for a specific talk-group over the control resource from the first base site;
      ii. means for requesting a resource allocation over the control resource from the resource controller in the second base site;
      iii. means for receiving a resource allocation over the control resource from the resource controller in the second base site;
      iv. means for receiving and, upon occasion, transmitting a communicated message over the allocated resource in the first base site and means for transmitting and, upon occasion, receiving the communicated message over the allocated resource in the second base site, and;
      v. means for routing the communicated message from the receiving means for communicated messages from the first base site to the transmitting means for communicated messages to the second base site and visa versa,
   the method comprising the steps of:
   A. monitoring by the radio link device of the control resource of the first base site for a resource allocation to a select group of communication units;
   B. receiving by the radio link device from the control resource of the first base site a resource allocation for the select group of communication units;
   C. transmitting by the radio link device over a control resource to the second base site controller a request for a resource allocation;

D. receiving by the radio link device over a control resource a communication resource grant from the second base site;

E. providing a route for communicated messages within the radio link device between the receiving means in the first base site and the transmitting means in the second base site and visa versa, and F. receiving from a requesting communication unit in a first base site and re-transmitting the communicated messages to a target in a second base site and visa versa.

5. The method as in claim 4 wherein the communication controller in the first base site performs the additional steps of: (1) detecting an end of transmission from the requesting communication unit, and (2) re-transmitting a de-key message to the radio link device following detection of the end of transmission, and the radio link device performs the step of transmitting an end of transmission message to the second base site resource controller upon receipt by the radio link device of the de-key message from the first base site resource controller.

6. The method as in claim 4 wherein the communication controller in the second base site performs the additional steps of: (1) detecting an initiation of transmission from the heretofore target communication unit within the repeater-hang-time time period, and (2) transmitting a key message to the radio link device, and upon receipt by the radio link device of such key message the radio link device re-transmitting the initiation of transmission to the first base site resource controller.

* * * * *